Patented Feb. 20, 1934

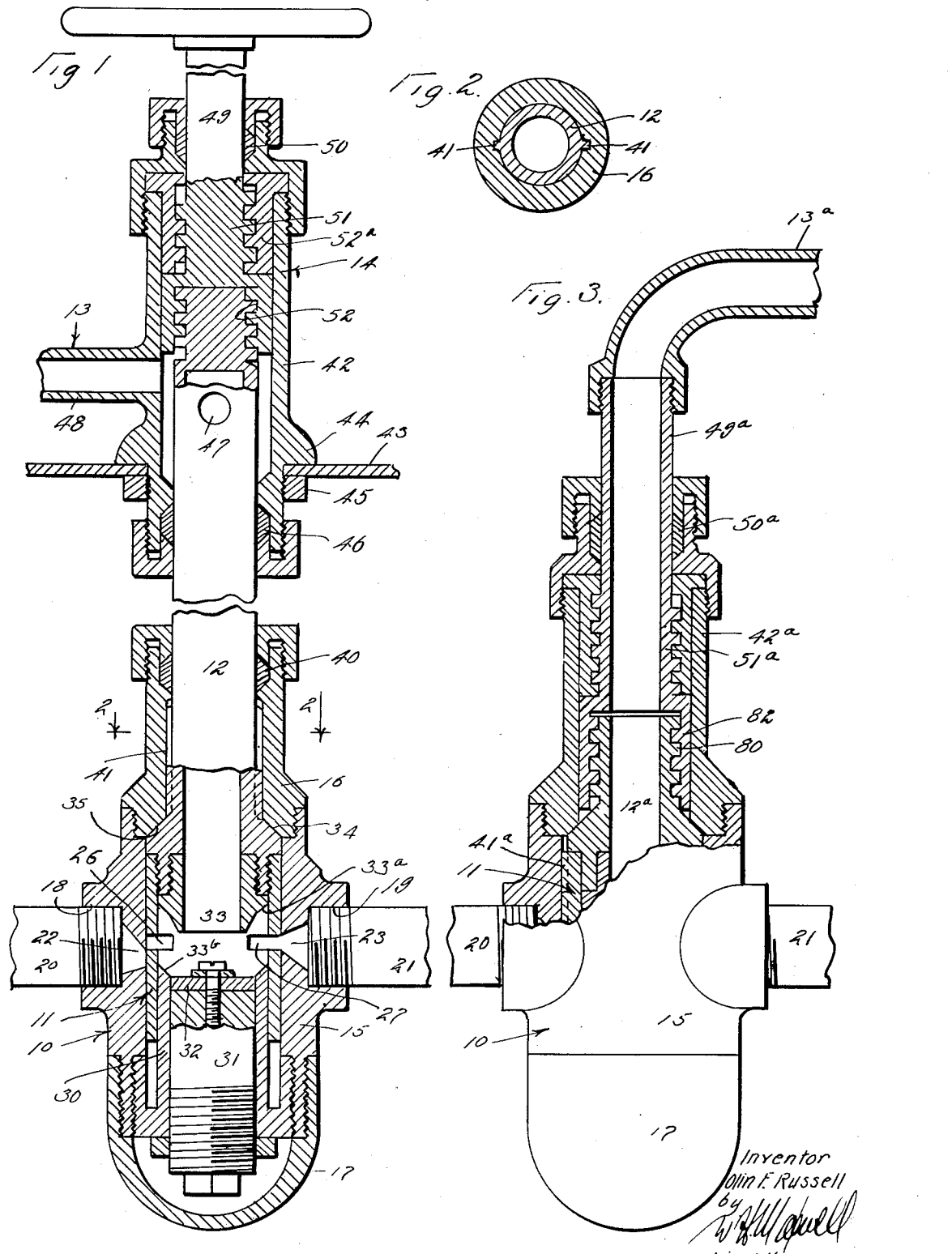

1,947,878

UNITED STATES PATENT OFFICE 1,947,878

VALVE

Olin F. Russell, Los Angeles, Calif.

Application May 9, 1927. Serial No. 189,847

43 Claims. (Cl. 277—33)

This invention has to do with a valve and has particular reference to a high pressure mixing valve. It is a general object of this invention to provide a valve operable to handle a plurality of fluids to discharge the fluids separately or simultaneously in the desired proportions.

It is an object of this invention to provide sealing means below valve inlet, thus eliminating the pressure ordinarily existing directly under the valve seats.

It is an object of this invention to provide a mixing valve which provides for discharging the fluids in any desired proportion.

It is another object of this invention to provide a mixing valve having a plurality of fluid seals which effectively prevent leakage.

Another object of the invention is to provide a valve of the type mentioned in which the fluid controlled by the valve is discharged through the stem of the valve.

It is another object of the invention to provide a valve including a washer for making a fluid tight seal when the valve is closed and including an additional sealing means whereby the washer can be replaced or renewed with the valve under pressure.

A further object of the invention is to provide an effective, improved operating means for a valve.

It is a further object of my invention to provide a neat, simple, economical valve that can be used in many situations in place of several valves and fittings now necessary to accomplish the same action.

Another object of the invention is to provide an operating means for a valve whereby the valve action is rapid.

A further object of the invention is to provide a mixing valve particularly useful in dwellings, and the like, to handle hot and cold water.

Another object of this invention is to provide a mixing valve embodying a washer and sealing means that can be put into operation to prevent flow of fluid through the valve allowing the washer to be removed while the valve is under pressure.

It is a further object of the invention to provide a valve with a removable sealing washer and two sealing means for holding pressure while the washer is removed.

The various objects and features of the invention will be best and more fully understood from the following detailed description of several forms and embodiments of the invention, throughout which description I will refer to the accompanying drawing, in which:

Fig. 1 is a longitudinal, detailed, sectional view of a valve construction and control embodying my present invention, this control being shown removed from the valve proper;

Fig. 2 is a transverse, sectional view taken as indicated by line 2—2 on Fig. 1; and Fig. 3 is a detailed, sectional view similar to Fig. 1, showing another form of construction embodying my invention.

Referring in particular to Figs. 1 and 2 of the drawing, my invention provides a valve body 10, a valve member 11 operable in the body, an operating stem 12 extending into the body 10 to operate the valve 11, discharge means 13 for conducting fluid from the stem, and operating means 14 for the stem.

The body 10, in accordance with the construction shown in the drawing, includes a central cylindrical part 15, a head 16 closing the upper end of the cylinder 15, and a cap 17 closing the lower end of the cylinder. The cylinder is provided in its sides with openings 18 and 19 to receive fluid conduits, for instance, pipes 20 and 21, respectively. For purpose of example, one of the pipes may be considered as carrying hot water and the other cold water. The openings 18 and 19 are in communication with spaced ports 22 and 23 which open into the interior of the cylinder. In the preferred construction, the ports 22 and 23 are located at diametrically opposite sides of the cylinder and are made comparatively narrow and to extend a substantial distance around within the cylinder. With this formation, the ports may be made of the desired area and yet extend but a short distance longitudinally of the cylinder.

The valve 11 is in the form of a sleeve slidably fitted within the cylinder 15 and provided in its sides with ports 26 and 27 to co-operate with the ports 22 and 23, respectively. The ports 26 and 27 are arranged around the sleeve valve 11 to correspond to the arrangement of the ports 22 and 23 and are located longitudinally in the sleeve so that the port 26 may be in register with the port 22 while the port 23 is closed, so that the port 27 may be in register with the port 23 when the port 22 is closed, or so that the port 22 is open with the port 26 at the same time that the port 23 is open with the port 27. In the particular arrangement shown in the drawing, the ports 26 and 27 are diametrically opposite and are arranged in the same position longitudinally in the sleeve, while the ports 22 and 23 are diametrically opposite but spaced apart longitudinally of the cylinder.

In accordance with my present invention, a sealing plug 30 is applied to the lower end of the cylinder 12 within the cap 17 to slidably fit or extend into the sleeve valve 11. The plug 30, in thus fitting the valve 11, forms a fluid seal around the inside of the sleeve. A washer carrier 31 is provided in the plug 30 to carry a washer 32 in position to co-operate with the end 33 of the stem 12. The washer carrier 31 is screwthreaded into or through the plug 30 so that it can be removed without disturbing the plug.

The stem 12 of the valve is tubular in form to act as a fluid conduit to conduct the fluid from the valve. The stem 12 extends into the body 10 through the head 16. The valve 11 is carried by the stem 12. The valve may be integral with the stem or screwthreaded to it, as shown in the drawing. A valve face 34 may be provided on the stem 12 or upper end of the valve within the body 10 to co-operate with a seat 35 in the head 16 to provide a fluid seal between the stem and body when the stem is in the up position. The lower end 33 of the stem extends into the valve 11 to co-operate with the washer 32 to provide a seal between the stem and body 10 closing the stem when the stem is in the down position which may be considered the closed position of the valve. Packing means 40 is provided on the upper end of the head 16 to pack around the stem 12 where the stem enters the head. The stem is held against rotation in the head 16 as by means of keys 41 so that the stem operates only longitudinally and, therefore, moves the valve 11 longitudinally in the cylinder 15 without turning it.

The end 33 is provided with a finished tapered face 33a to co-operate with a corresponding face 33b on the upper end of the plug 30. In the preferred construction, the end 33 seats on the washer before the faces 33a and 33b come together. When the washer is to be removed, the washer carrier is backed down in the plug, allowing the face 33a to be lowered into engagement with the face 33b to seal or close the end of the stem in addition to the seal existing between the valve sleeve and cylinder 15.

In the construction under consideration, the operating means 14 is formed separately from the parts just described and includes a body 42 to be applied to a fixture 43, or the like. The lower end of the body 42 is adapted to project through an opening in the fixture and is provided with a flange 44 to engage the upper side of the fixture. A retaining nut 45 is screwthreaded onto the lower end portion of the body to engage the lower side of the fixture. Packing means 46 is provided on or at the lower end of the body 42 where the stem 12 enters the body. The stem 12 projects upwardly into the body 42 and is provided within the body with openings 47 to discharge fluid into the body so that it will flow out through the discharge means 13. The discharge means 13 in this form of the invention is in the form of a spout 48. An operating stem 49 extends into the upper end of the body 42 through packing means 50 and is provided within the body with an externally screwthreaded part 51 that threads in a part of the body. A screwthreaded socket 52 is provided on the lower end of the part 51 to receive the upper end of the stem 12. With this arrangement, rotation of the operating stem 49 causes it to move longitudinally through the action of the threaded part 51 and also causes the stem 12 to move longitudinally relative to the stem 49 through the action of the threaded part 52. By thus providing two threaded parts in connection with the operating means, the stem 12 is operated through a substantial distance longitudinally upon comparatively little rotation of the stem 49. In practice, the part 52a of the body in which the threaded part 51 operates may be integral with the body 42 or may be a separate part fixed in the body.

In Fig. 3 of the drawing, I disclose another form of the invention in which the operating means 14 is incorporated with the valve proper as a unit and in which the discharge spout forms the operating handle.

In this form of the invention, the body 42a of the operating means is formed integral with, or as a continuation of, the body 10. The valve stem 12a projects upwardly into the body 42a and is provided on its upper end with external threads 80. The operating stem 49a in this case is tubular in form and projects downwardly into the body 42a through its upper end. Packing means 50a is provided at the upper end of the body around the stem 49a. The stem 49a is provided within the body with an external threaded part 51a operating in a threaded part of the body, and is provided on its lower end with an internally threaded socket part 82 which receives the threaded upper end of the valve stem 12a. In this form of the invention, the valve stem 12a is held against rotation as by means of keys 41a. This arrangement operates much the same as the one above described; for instance, when the operating stem 49a is rotated, it is moved longitudinally through the action of the threaded part 51a. This longitudinal movement is communicated to the stem 12a and the stem 12a is further moved longitudinally through the action of the threads 80 in the socket part 82.

In this form of the invention, the discharge spout 13a is formed on, or in communication with, the outer end of the operating stem 49a to project laterally therefrom. The spout 13a in this case forms an operating handle by which the stem 49a can be easily rotated in the desired manner. In carrying out this form of the invention, the other parts of the valve, that is, the valve part proper, the plug 30, washer, and washer carrier, etc., may be the same as corresponding parts in the form of the invention first described.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A valve including a cylindrical body having spaced ports, a valve sleeve slidable in the body and having ports to co-operate with the ports in the body, the ports in the body and in the valve being related so that the valve is operable to open communication between both of the ports in the body and the interior of the valve and a tubular valve stem in communication with the interior of the valve sleeve forming an outlet conduit.

2. A valve including a cylindrical body having spaced ports, a valve sleeve slidable in the body and having ports to co-operate with the ports in the body, the ports in the body and in the valve being related so that the valve is operable to open communication between both of the ports in the body and the interior of the valve, a plug at one end of the body slidably fitting into the sleeve, and a hollow stem at the other end of the body connected with the sleeve forming an outlet conduit.

3. A valve including a cylindrical body having spaced ports, a valve sleeve slidable in the body and having ports to co-operate with the ports in the body, a plug at one end of the body extending into the sleeve, a washer carried by the plug, and a hollow stem at the other end of the body connected with the sleeve, the end of the stem being adapted to co-operate with the washer to close the stem.

4. A valve including a cylindrical body having spaced ports, a valve sleeve slidable in the body and having ports to co-operate with the ports in the body, a plug at one end of the body extending into the sleeve, a washer carried by the plug for removal therefrom, a hollow stem for operating the sleeve, the end of the stem being adapted to co-operate with the washer to close the stem, and means operable to close the stem during removal of the washer.

5. A valve including a cylindrical body having spaced ports, a valve sleeve slidable in the body and having ports to co-operate with the ports in the body, a plug at one end of the body extending into the sleeve, a washer carried by the plug for removal therefrom, a hollow stem for operating the sleeve, the end of the stem being adapted to co-operate with the washer to close the stem, and means operable to close the stem during removal of the washer, said means including co-operating seats on the stem and plug.

6. A valve including a cylindrical body having spaced ports, a valve sleeve slidable in the body and having ports to co-operate with the ports in the body, a plug at one end of the body extending into the sleeve, a washer, a carrier for the washer removably carried by the plug, a hollow stem for operating the sleeve and adapted to co-operate with the washer, and means operable to close the stem to allow removal of the washer carrier.

7. A valve including a cylindrical body having spaced ports, a valve sleeve slidable in the body and having ports to co-operate with the ports in the body, a plug screwthreaded to one end of the body to extend into the sleeve, a washer, a carrier for the washer screwthreaded in the plug, and a stem extending into the body from the other end and carrying the sleeve, the inner end of the stem being adapted to co-operate with the washer.

8. A valve including a cylindrical body having spaced ports, a valve sleeve slidable in the body and having ports to co-operate with the ports in the body, a plug screwthreaded to one end of the body to extend into the sleeve, a washer, a carrier for the washer screwthreaded in the plug, a cap on said end of the body over the plug, and a stem extending into the body from the other end and carrying the sleeve, the inner end of the stem being adapted to co-operate with the washer.

9. A valve including a cylindrical body having spaced ports, a valve sleeve slidable in the body and having ports to co-operate with the ports in the body, an operating stem in connection with the sleeve and projecting from the body, the stem having a longitudinal opening in communication with the ports of the sleeve forming a fluid passage and means holding the sleeve against rotation in the body.

10. A valve including a body having a port, a valve member having a sealing fit in the body and having an opening to co-operate with the port in the body to control flow through the valve, a removable washer for making a seal when the flow is cut off, and auxiliary sealing means for operation during removal of the washer.

11. A valve including a hollow cylindrical body, there being ports in the body spaced apart longitudinally of the body, a valve sleeve slidable in the body and having ports to co-operate with the ports in the body, and a tubular valve stem for operating the sleeve and being in communication with the interior of the body, the ports in the body and sleeve being related so that the sleeve is operable to positions where either one or both of the body ports are in communication with the ports in the interior of the body.

12. A valve, including a tubular body having spaced ports, a plug in one end of the body, a valve sleeve slidable in the body and having a sealing sliding fit with the plug and with the interior of the body, there being ports in the sleeve for co-operating with the ports in the body, and a stem carrying the sleeve and having a fluid discharge passage communicating with the interior of the body.

13. A valve, including a tubular body having spaced ports, a plug in one end of the body, a washer carried by the plug, and a tubular valve member operable in the body first to a position to form a seal with the interior of the body to close said ports and later to a position to seal with the washer to close its end.

14. A valve, including a tubular body having spaced ports, a plug in one end of the body, a washer carried by the plug, a tubular valve member slidable in the body, and means for operating the valve member to seal with the body to close said ports and to co-operate with the washer.

15. A valve, including a tubular body having a port, a plug in the body having a valve seat, a tubular valve member slidable in the body, a valve face on the inner end of the valve member to co-operate with the said valve seat, and a sleeve on the valve member operable to slidably seal with the interior of the body and the exterior of the plug to close said port.

16. A valve, including a tubular body having spaced ports, a plug in one end of the body, a washer carried by the plug, a tubular valve member slidable in the body and operable to seal with the walls of the body to close said ports, and means for operating the washer into compression sealing engagement with the end of the valve member.

17. A valve, including a tubular body having spaced ports, a plug in one end of the body, a washer, means carrying the washer for adjustment in the plug, a valve seat on the plug, and a tubular valve member slidable in the body operable to close the ports or to seal with the washer or the valve seat, depending upon the adjustment of the washer.

18. A valve, including a tubular body having spaced ports, a plug in the body below the ports, a stationary valve seat on the plug and an adjustable valve seat on the plug, and a tubular valve member slidably fitting the interior of the body and operable to close the ports and operable into sealing engagement with either of the said valve seats, depending upon the position of the adjustable valve seat.

19. A device of the kind described consisting of a valve device, members entering the opposite ends of the valve and operable together to close the valve device, one of said members having a plurality of removable valve sealing faces on one end for engagement with corresponding sealing faces on said valve device.

20. In a valve device having an inlet and an outlet, a tubular fluid discharge valve member movable therein, and means whereby said intake and outlet may be separately sealed upon actuation of said valve member alone.

21. In a valve device having an inlet and an outlet, means for sealing both the inlet and the outlet together or separately, and a unitary flow regulator being adjustably operated for the purpose of actuating the other means in its simultaneous or separate sealing action.

22. A valve including a body having an intake part, a valve member in the body for controlling the flow through the body, a removable washer-carrier carrying a washer for making a seal when the flow is off; or on, auxiliary sealing means for the operation of the valve during removal of washer and washer carrier, and means whereby the washer and auxiliary sealing means may operate simultaneously upon the valve member being operated to a given closed position.

23. In a device as described a valve having a passageway whose wall is formed with sealable surfaces, a discharge member guided in said valve device coaxially of the passageway and being valve-faced on its extreme inner open end and provided with valve sealing means operable, when brought in contact with the sealable surfaces in said valve device to form slide and compression sealing means therewith.

24. A device as described consisting of a valve body formed with a valve sealable surface, with a lateral inlet port, and with a fluid passage beyond its valve sealable surface, a flow control member in said valve body operable to receive and discharge various fluids through the valve body separately or together, the contacting of the respective valve sealing surfaces of the member and valve body effecting the automatic closing of the inlet port whilst allowing said fluid passage to remain open, and means controlling the actuation of said member, whereby when its valve sealing surfaces engage with those of the valve body, all the foregoing ports may be opened or closed alternately or together.

25. In combination with a valve, a valve casing for the valve, a plug engageable adjustably in the casing and providing a valve seat for the valve, a pair of oppositely arranged pipes connected for communication with the valve casing at points spaced between the valve and the plug seat, and means slidable relatively to the valve and plug at the same time for controlling the passage of fluid through both pipes respectively.

26. In a valve structure, a valve casing, a plug closing one end thereof, a tubular valve movable in said casing towards and in engagement with the plug, oppositely arranged pipes having a line of fluid flow intersecting the casing between the tubular valve and the plug and being both sealed when the valve and plug contact, said plug being adjustable so as to move to contact the valve to again seal the pipes.

27. In a pipe fitting, the combination of a tubular casing, a bushing removably engaging one end thereof and projecting thereinto to provide a valve seat, a pair of pipes connected to said casing in the vicinity of the valve seat, a tubular valve in the casing movable therein to close communication between the pipes and the valve casing, and movable against the valve seat to engage the same, and a plug screwing into the bushing to close the same and the valve casing, such that, when the plug is removed from the bushing the tubular valve may still engage the valve seat.

28. In a pipe fitting, the combination of a valve casing having at diametrically opposite points a pair of pipes, a bushing removably projecting into one end of the valve, a tubular valve slidably mounted in said casing and having a seating action in contact with the bushing to close the latter, and carrying a sleeve designed to slide telescopically of the bushing, said sleeve designed as it moves to shut off the fluid flow through the pipes, said tubular valve with its sleeve being removable from the casing, and a plug screwing removably into the bushing for closing the casing when the valve and sleeve is removed from the casing.

29. A valve device having a seat, a valve plug engageable in said seat, and a valve-faced tubular discharge member also engageable with said seat and engageable by said valve plug to seal the end of the discharge member.

30. A valve device having an inlet and an outlet tubular valve member movable in said device and also having a valve seat, a plug engageable in the latter seat, means whereby said inlet may be separately sealed upon actuation of the valve member, said valve member being engageable with the valve seat to seal itself, and means whereby the plug may be operated into sealing engagement with the discharge member to again seal it at its end.

31. A valve device having an inlet, a tubular outlet and discharge valve member movable in said device and having provision for sealing the inlet as it moves, and means whereby the discharge member may seal its end twice as it is actuated.

32. A device consisting of a tubular valve-operating stem open at its inner and outer ends, a valve body in which said stem is positioned, a tubular valve flow regulator adjustably positioned in said body, in line with the stem, the confronting ends of the stem and regulator having contacting valve seats, a plug in said regulator for closing the passage of fluid through said stem, said valve body having oppositely disposed passages for fluid flow both of which are closable at the same time when the stem and regulator contact, and means whereby the flow through both passages is also closed at the same time when the stem and regulator are out of contact.

33. In a valve device, as described, the combination of a valve casing, a tubular fluid valve in said casing, means for movably actuating said fluid valve, and means associated with said valve designed, as said valve is actuated, to engage it to seal the valve with a dual compression action endwise and sidewise as well as with a slide-seal action.

34. A valve device having two fluid ports arranged laterally thereof and a fluid member, a tubular outlet valve movable in said device, complemental compressive means on the fluid member and on the tubular valve for stopping the passage through the former, and slidable means acting in time with the last-named means for controlling the fluid flow through both ports.

35. In a device as described in combination, a valve structure having a chamber, a fixed tubular valve removably mounted in the chamber, a movable tubular valve adjustably mounted in said chamber and engageable with the fixed tubular valve for sealing purposes, said chamber having an open passage between both tubular valves sealable by the movable valve, and means removably closing the fixed tubular valve and designed to seal the movable valve independently of the fixed tubular valve.

36. In a device as described, a pair of contacting coaxial separable tubular valves, a valve chamber housing both valves and having between them oppositely arranged staggered ports sealable by one of said valves, and a plug sealing one valve whilst engageable with the other valve to seal the latter.

37. In a device as described, a tubular valve structure, a fixed tube therein having provision for closing the structure at one end and having provision for providing a seat, a tubular valve stem adjustable in said structure and contactable with the valve seat so as to be closed thereby, said valve structure providing diametrically opposite ports adapted to be sealed when the stem contacts the valve seat, and means carried by said stem for barring the ports as the stem is adjusted towards and from said valve seat.

38. In a valve device the combination of a fluid chamber therein having oppositely arranged ports, a tubular fixed member in said chamber closing the latter and providing a valve face, a plug mounted in said fixed member for movement in advance of said valve face, and a tubular discharge valve movable into said chamber to contact either the valve face and the plug, separately or together for fluid sealing purposes.

39. In a valve structure the combination of a fluid chamber having a tubular bore and provided with a valve seat, a tubular discharge valve projecting into the chamber for movable sealing contact with the valve face, a plug closing the chamber, and means whereby the plug and the tubular discharge member may be brought into contact with each other for closing said member.

40. A valve body having an inlet, a coaxially movable tubular fluid discharge member in said body, said discharge member conveying fluid longitudinally of the body and designed to make a surface seal against the inlet, and means whereby said discharge member is closed by a compression seal as it makes a surface seal against said inlet.

41. A valve body formed with an inlet nipple, a tubular valve member movable therein angularly of said inlet nipple and designed peripherally to close the latter, a removable valve seat disposed in said body of the valve member, and a compression washer in said seat designed to be engaged by the intake end of the valve member to effect the closing of the latter to prevent passage of fluid by way of said inlet longitudinally in said member.

42. In a device of the kind described, the combination of a tubular valve body, an imperforate plug closing one end thereof and having a valve seat, a tubular valve member movable in said body and receiving fluid longitudinally thereof, and also having provision for making a compression seal against said seat to seal itself, and an inlet nipple on said body communicating with the interior of the latter and designed to be closed by the surface contact made thereagainst by the movable valve member.

43. In a device of the kind described the combination of a valve body, a tubular discharge valve projecting movably thereinto, said body having a fixed inlet nipple for conducting fluid into the inner end of the valve, a fixed valve seat in advance of said inlet nipple, said valve designed to move toward said seat to close said inlet nipple and to close it upon engagement with the seat so it closes itself.

OLIN F. RUSSELL.